March 22, 1938.  W. H. FISCHER  2,111,849
ELECTRIC APPLIANCE CONSTRUCTION
Filed Sept. 18, 1935
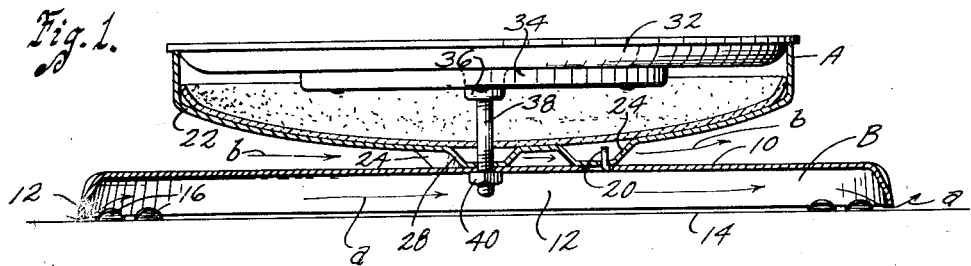
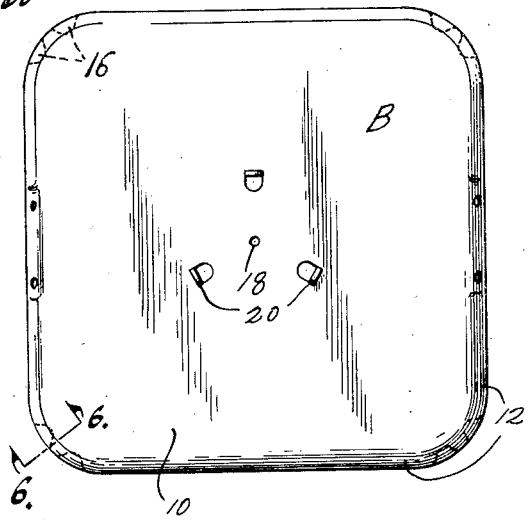
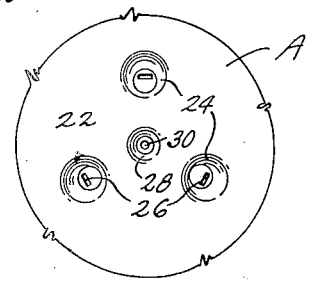
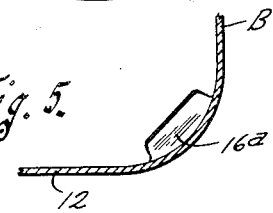
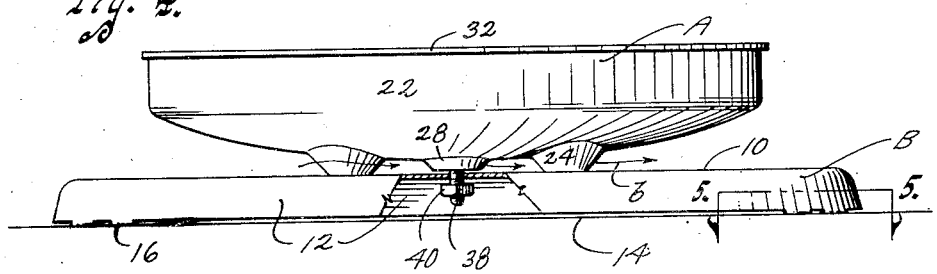
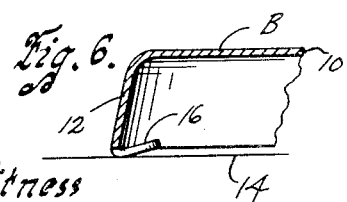
Inventor
William H. Fischer
by Bair, Freeman & Sinclair
Attorneys
Witness
H. S. Munzenmaier Patented Mar. 22, 1938

2,111,849

UNITED STATES PATENT OFFICE 2,111,849

ELECTRIC APPLIANCE CONSTRUCTION

William H. Fischer, St. Louis, Mo., assignor to Knapp-Monarch Company, St. Louis, Mo., a corporation of Missouri Application September 18, 1935, Serial No. 41,092

4 Claims. (Cl. 219—37)

An object of my invention is to provide an electric appliance construction which is simple, durable and comparatively inexpensive to manufacture.

A further object is to provide for a heated appliance a base member which is relatively flat, yet is so shaped and mounted that air circulation can occur between the base and a table top or the like on which the base is supported, the appliance being so associated with the base that further air circulation is permitted between the appliance and the base, to minimize transmission of heat from the appliance to the table top.

A further object is to provide supporting means for the appliance on the base concentrated about one point on the bottom of the appliance and preferably located centrally with respect to supporting means for the base, so as to maximize the distance through which heat must travel from the appliance to the supporting means and thus minimize the transmission of heat to the table top.

A further object is to provide the base rectangular in outline with the supporting means at the corners thereof to further maximize the heat transmission distance without, however, providing a base member of exceptionally large and therefore awkward size.

Another object is to provide supporting means for the appliance on the base comprising perforated projections, the base having means coacting with the perforations thereof to prevent lateral displacement and a single securing means, such as a bolt, being provided to secure the appliance against upward movement relative to the base.

Another object is to provide the base member in the form of a heat reflecting member so that heat radiated from the appliance will be reflected from the base rather than absorbed by it and transmitted to the table top.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a vertical, central, sectional view through an electric appliance structure embodying my invention, showing the base member supporting an electrically heated waffle iron, the lower half only thereof being illustrated.

Figure 2 is a plan view of the base member.

Figure 3 is a plan view of a part of the bottom of the casing for the appliance which coacts with the base member.

Figure 4 is a side elevation of the structure, partly in section showing a step in the assembly thereof.

Figure 5 is a sectional view as on the line 5—5 of Figure 4 showing a modified construction; and Figure 6 is a sectional view on the line 6—6 of Figure 2 showing a supporting foot for the base.

On the accompanying drawing, I have used the reference character A to indicate generally an electric appliance and B a base therefor. The base B has a relatively flat top wall formed of heat reflecting material, such as polished metal.

The top wall 10 is rectangular in outline and the base is inverted pan shaped. A flange 12 extends downwardly from the periphery thereof. This provides a substantial air space beneath the top wall 10 without, however, giving prohibitive thickness to the base.

The base B is adapted for support on a table top or the like, preferably the lower edge of the flange 12 is spaced slightly thereabove, this being accomplished by inturned feet 16 formed of the sheet metal of which the base is formed. These need not space the lower edge of the flange 12 very high above the table top 14, the thickness of the metal being approximately sufficient for air circulation indicated by arrows $a$ in Figure 1.

I have provided a pair of the feet 16 and these are preferably located at the corners of the rectangular base B. If desired, a single foot 16a, as shown in Figure 5, can be used in place of each pair of feet.

The top wall 10 is provided with a central perforation 18 and a plurality of upstanding tongues 20 adjacent thereto and spaced around the perforation. The appliance A includes a sheet metal casing 22 which I provide with a plurality of depressed portions 24 corresponding to the tongues 20. These depressed portions 24 are each provided with a perforation 26 to receive the tongues 20 for lateral positioning purposes. Another depressed portion 28 is provided having a perforation 30 adapted to register with the perforation 18 of the base B when the appliance casing is mounted thereon.

The appliance is further illustrated as including a heating plate 32. A heating element 34 is secured to the bottom thereof for heating the plate. The plate is provided with a boss 36 to which a stud 38 is secured. The stud 38 extends through the perforations 30 and 18 and has a nut 40 on the lower end thereof beneath the base for securing the appliance to the base.

The portion 28 as shown in Figure 4 is not depressed quite as far as the portions 24. Accordingly, during assembly the portions 24 act as a support, the portion 28 being drawn toward the base to the position shown in Figure 1 by tightening the nut 40. This insures that the appliance will be supported by the supporting bosses 24 instead of by one or two of them in conjunction with the boss 28, which would permit "rocking" of the appliance relative to the base.

It will be noted that the portions 24 are concentrated about the boss 28 at the center of the appliance A. The remaining major portion of the appliance casing 22 is curved upwardly away from the base B so as to provide an air space for free circulation of air as indicated by the arrow b.

The supports 24 are in the form of projections so that there is also space among them between the appliance and base for air circulation. Thus the majority of heat absorbed from the heating element 34 and the plate 32 by the casing 22 is radiated to atmosphere instead of being transmitted through the supporting means for the appliance on the base to the base and by it to the table top 14. Some of the heat, of course, will be transmitted through the bosses 24 and 28 and the stud 38 to the base B but this heat can affect the table top 14 only by radiation from the base and by conduction through the base and the feet 16 to the table top. The circulation indicated by the arrows a reduce radiation to a minimum and this circulation and also the circulation indicated by the arrows b carry heat away from the base member and into the surrounding atmosphere. Conduction of heat by the base member is minimized by concentrating support for the appliance at the center of the base and providing the feet 16 at the outer edges of the base so as to maximize the distance through which conduction must take place.

By a combination of the features disclosed in connection with my invention it is obvious that I have produced an electric appliance structure which is inexpensive to manufacture yet provides for an efficient dissipation of the heat to atmosphere rather than affecting the supporting table top to any great degree. These features make it possible to provide a very low mounted appliance without danger of the heat therefrom damaging a table or other support for the appliance.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a device of the class described, an inverted pan shaped base having a relatively flat top rectangular in outline, means at each corner thereof for supporting said base spaced from a supporting surface therefor, an appliance provided with heating means and having a plurality of perforated supporting projections of substantial height concentrated about one point on the bottom thereof, means projecting from said base to enter said perforations and thereby position said appliance laterally with respect to said base and means for securing said appliance to said base.

2. In a device of the class described, an inverted shallow pan shaped base, means for supporting said base spaced from a supporting surface therefor, an appliance provided with heating means and having a plurality of perforated supporting projections concentrated about one point on the bottom thereof, said projections being of substantial height to permit atmospheric air circulation between said base and appliance, means projecting from said base to enter said perforations and thereby position said appliance laterally with respect to said base and means for securing said appliance to said base.

3. In a device of the class described, an inverted pan shaped base, rectangular in outline, means at each corner thereof for supporting said base spaced from a supporting surface therefor, an appliance provided with heating means and having a plurality of perforated supporting projections concentrated about one point on the bottom thereof, means projecting from said base to enter said perforations and thereby position said appliance laterally with respect to said base and means for securing said appliance to said base, said appliance with the exception of the portion thereof about said perforated projections being spaced by said projections from said base to permit ready air circulation between the base and appliance.

4. In a device of the class described, an inverted pan shaped base, means for supporting said base spaced from a supporting surface therefor, an appliance provided with heating means and having a casing of sheet metal provided with a plurality of downwardly depressed perforated supporting portions of substantial height concentrated about one point on the bottom of said appliance, means projecting from said base to enter said perforations and thereby position said appliance laterally with respect to said base, said supporting portions permitting ready circulation of atmospheric air about said portions and between said base and appliance and means for connecting said appliance to said base against upward displacement therefrom.

WILLIAM H. FISCHER.